United States Patent
zur Loye et al.

(10) Patent No.: US 8,904,769 B2
(45) Date of Patent: Dec. 9, 2014

(54) SYSTEMS AND METHODS USING INTERNAL EGR FOR AFTERTREATMENT SYSTEM CONTROL

(75) Inventors: Axel Otto zur Loye, Columbus, IN (US); John D. Ridge, Indianapolis, IN (US)

(73) Assignee: Cummins Inc., Columbus, IN (US)

( * ) Notice: Subject to any disclaimer, the term of this patent is extended or adjusted under 35 U.S.C. 154(b) by 224 days.

(21) Appl. No.: 13/414,853

(22) Filed: Mar. 8, 2012

(65) Prior Publication Data

US 2013/0232952 A1 Sep. 12, 2013

(51) Int. Cl.
- *F01N 3/00* (2006.01)
- *F01N 3/10* (2006.01)
- *F01L 1/34* (2006.01)
- *F02B 47/08* (2006.01)
- *F02M 25/07* (2006.01)

(52) U.S. Cl.
USPC .................. 60/301; 60/274; 60/276; 60/285; 123/90.15; 123/568.14

(58) Field of Classification Search
USPC ......... 60/274, 276, 284, 285, 301; 123/90.15, 123/568.14
See application file for complete search history.

(56) References Cited

U.S. PATENT DOCUMENTS

| | | | |
|---|---|---|---|
| 7,832,197 B2 | 11/2010 | Leone | |
| 2002/0174841 A1* | 11/2002 | Ashida | 123/90.15 |
| 2003/0164163 A1* | 9/2003 | Lei et al. | 123/568.14 |
| 2004/0112331 A1* | 6/2004 | Miura | 123/346 |
| 2009/0250041 A1* | 10/2009 | Minami | 123/568.12 |
| 2010/0018483 A1* | 1/2010 | He et al. | 123/90.15 |
| 2011/0214643 A1* | 9/2011 | Blizard et al. | 123/468 |
| 2012/0035826 A1* | 2/2012 | Imai et al. | 701/102 |

FOREIGN PATENT DOCUMENTS

| | | | | |
|---|---|---|---|---|
| WO | WO 2011117969 A1 * | 9/2011 | | F02D 13/02 |
| WO | WO 2012001888 A1 * | 1/2012 | | F02D 23/00 |

* cited by examiner

*Primary Examiner* — Audrey K Bradley
(74) *Attorney, Agent, or Firm* — Krieg DeVault LLP

(57) ABSTRACT

An internal combustion engine system includes: an engine with a plurality of pistons housed in respective ones of a plurality of cylinders; an air intake system to provide air to the plurality of cylinders through respective ones of a plurality of intake valves; an exhaust system to release exhaust gas from the plurality of cylinders through respective one of a plurality of exhaust valves; an aftertreatment system to treat exhaust emission from the engine; at least one sensor to provide a sensor signal corresponding to an efficiency of the aftertreatment system; and a controller coupled to the at least one sensor and operable to regulate an internal exhaust gas recirculation operation in the cylinders when the aftertreatment system operates at less than a desired efficiency.

17 Claims, 2 Drawing Sheets

SYSTEMS AND METHODS USING INTERNAL EGR FOR AFTERTREATMENT SYSTEM CONTROL

BACKGROUND

The present invention relates to operation of an engine with aftertreatment, and more particularly, but not exclusively relates to using internal exhaust gas recirculation (EGR) to lower engine out $NO_x$ emissions at times when aftreatment system efficiency is low and to control aftertreatment system efficiency during engine operation.

Various aftertreatment subsystems have been developed to control exhaust emissions from internal combustion engines. The performance of aftertreatment subsystems often varies with temperature, which has led to the development of various thermal management schemes. Unfortunately, these schemes can require multiple additional components to implement and therefore increase the cost of the system, and often fall short of performance goals when the engine is initially started or operates with a relatively light load because desired temperature levels and other operating conditions to efficiently operate aftertreatment systems are difficult to reliably attain. Thus, there is a continuing demand for further contributions in this area of technology.

SUMMARY

One embodiment of the present invention includes a unique technique to regulate operation of an internal combustion engine. Other embodiments include unique apparatus, devices, systems, and methods involving the control of an internal combustion engine system for lowering $NO_x$ emissions when aftertreatment efficiency is low and for efficient operation of aftertreatment systems. Further embodiments, forms, objects, features, advantages, aspects, and benefits of the present application shall become apparent from the detailed description and drawings included herein.

DETAILED DESCRIPTION OF REPRESENTATIVE EMBODIMENTS

Figure 1:
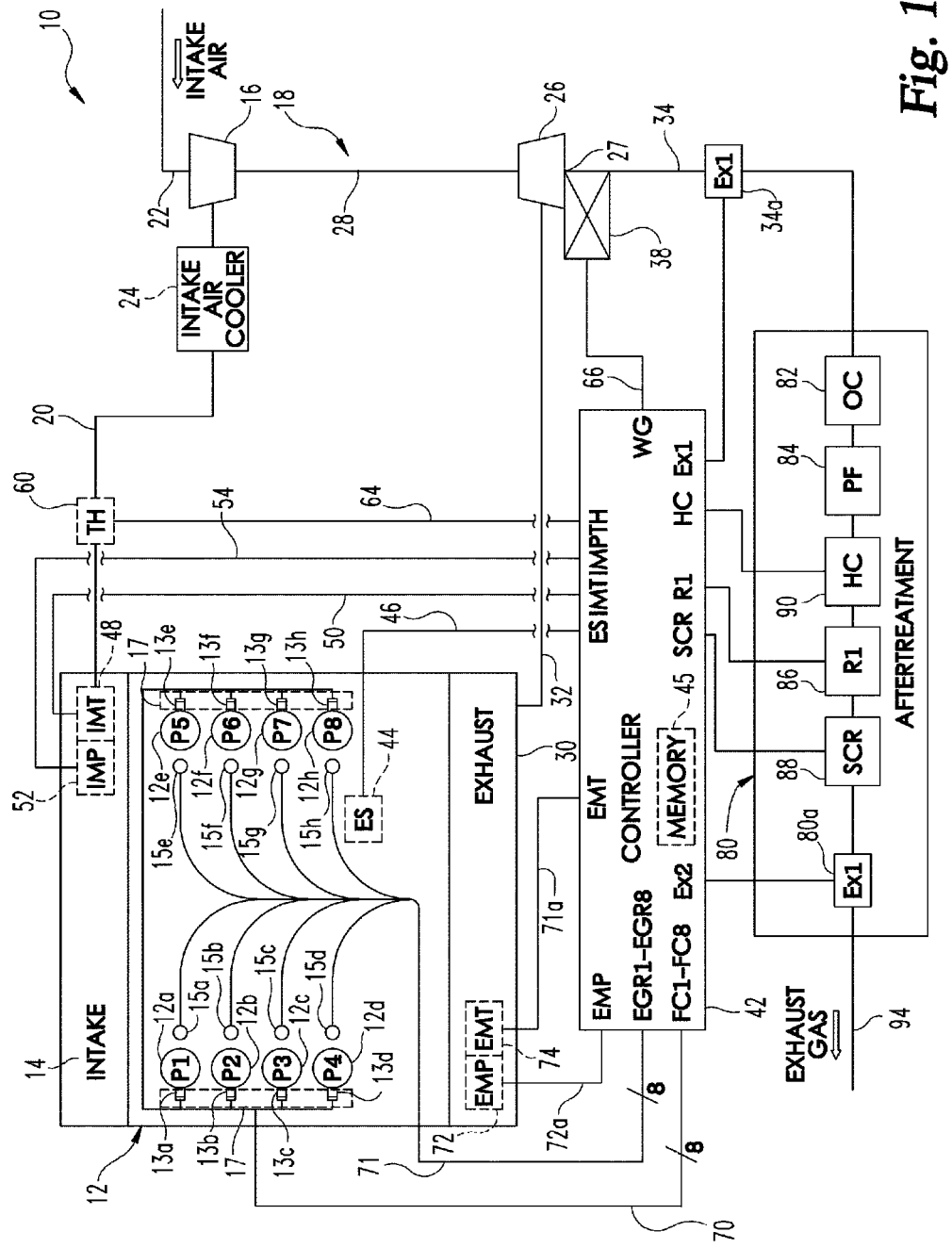
FIG. 1 is a diagrammatic view of an internal combustion engine system including an aftertreatment system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

FIG. 1 shows an internal combustion engine system 10 of one embodiment of the present invention. System 10 includes an internal combustion engine 12 having an intake manifold 14 fluidly coupled to an outlet of a compressor 16 of a turbocharger 18 via an intake conduit 20. Compressor 16 includes a compressor inlet coupled to an intake conduit 22 for receiving fresh air therefrom. System 10 may also include an intake throttle 60 of known construction disposed in line with intake conduit 20 between compressor 16 and intake manifold 14. Optionally, as shown in phantom in FIG. 1, system 10 may include an intake air cooler 24 of known construction disposed in line with intake conduit 20 between compressor 16 and intake manifold 14. The turbocharger compressor 16 is mechanically coupled to a turbocharger turbine 26 via a drive shaft 28. Turbine 26 includes a turbine inlet fluidly coupled to an exhaust manifold 30 of engine 12 via an exhaust conduit 32. Collectively, conduit 20, intake manifold 14, engine 12, exhaust manifold 30, and conduit 32 define a pathway along which gas flows from compressor 16 to turbine 26 during nominal operation of engine 12. Engine 12 can be of any type, and is a diesel engine in one particular embodiment.

For the depicted embodiment, engine 12 is of a reciprocating piston type with four stroke operation, and runs on diesel fuel received by direct or port injection with compression ignition. More specifically, as schematically represented in FIG. 1, engine 12 includes, for purposes of illustration and not limitation, eight pistons P1-P8 that are disposed in cylinders 12a-12h, respectively. Pistons P1-P8 are each connected to a crankshaft by a corresponding connecting rod (not shown) to reciprocally move within the respective cylinder 12a-12h in a standard manner for four stroke engine operation. Each cylinder 12a-12h includes a combustion chamber with appropriate intake and exhaust valves (not shown) that are opened and closed via a camshaft 17 and fuel injectors 13a-13h, respectively. Fuel injectors 13a-13h are of a standard type that operate in response to signals from electronic controls described in greater detail hereinafter. Fuel injectors 13a-13h receive fuel from a fuel source (not shown) in fluid communication therewith.

Engine 12 further includes an internal exhaust gas recirculation (EGR) subsystem that is individually controllable for each cylinder 12a-12h as designated by EGR exhaust valve actuators 15a-15h, respectively. In one form, EGR exhaust valve actuators 15a-15h include any configuration known for compression or engine brake type devices. For example, the EGR exhaust valve actuators can include a cam shaft connected to a cam with a cam lobe that acts on the exhaust valve to open the exhaust valve on command that is separate and independent of the intake and exhaust valve cam shaft 17 that operates during non-internal EGR operation, allowing full optimization of the intake and exhaust valve operations during non-internal EGR operation. EGR exhaust valve actuators 15a-15h each hold open a respective exhaust valve when activated, which more particularly provides an internal EGR mode of operation, such that exhaust is drawn in the respective cylinder 12a-12h through the open exhaust valve during an intake stroke of the respective piston P1-P8. Alternatively or additionally, in other embodiments, engine 12 may operate with a different type of fuel, have a different number of cylinders, and/or otherwise differ as would occur to those skilled in the art.

System 10 includes a controller 42 that is generally operable to control and manage operational aspects of engine 12. Controller 42 includes memory 45 as well as a number of inputs and outputs for interfacing with various sensors and systems coupled to engine 12. Controller 42 can be an electronic circuit comprised of one or more components, including digital circuitry, analog circuitry, or both. Controller 42 may be a software and/or firmware programmable type; a hardwired, dedicated state machine; or a combination of these. In one embodiment, controller 42 is of a programmable microcontroller solid-state integrated circuit type that includes memory 45 and one or more central processing units. Memory 45 can be comprised of one or more components and can be of any volatile or nonvolatile type, including the solid-state variety, the optical media variety, the magnetic variety, a combination of these, or such different arrangement as would occur to those skilled in the art. Controller 42 can include signal conditioners, signal format converters (such as analog-to-digital and digital-to-analog converters), limiters, clamps, filters, and the like as needed to perform various control and regulation operations described herein. Controller 42, in one embodiment, may be a standard type sometimes referred to as an electronic or engine control module (ECM), electronic or engine control unit (ECU) or the like, that is directed to the regulation and control of overall engine operation. Alternatively, controller 42 may be dedicated to control of just the operations described herein or to a subset of controlled aspects of engine 12. In any case, controller 42 preferably includes one or more control algorithms defined by operating logic in the form of software instructions, hardware instructions, dedicated hardware, or the like. These algorithms will be described in greater detail hereinafter, for controlling operation of various aspects of system 10.

Controller 42 includes a number of inputs for receiving signals from various sensors or sensing systems associated with elements of system 10. While various sensor and sensor inputs are discussed herein, it should be understood that other sensor and sensor inputs are possible. Furthermore, one or more sensors and sensor inputs discussed herein may not be required. The operative interconnections of controller 42 and elements of system 10 may be implemented in a variety of forms, for example, through input/output interfaces coupled via wiring harnesses, a datalink, a hardwire or wireless network and/or a lookup from a memory location. In other instances all or a portion of the operative interconnection between controller 42 and an element of system 10 may be virtual. For example, a virtual input indicative of an operating parameter may be provided by a model implemented by controller 42 or by another controller which models an operating parameter based upon other information.

System 10 includes an engine speed sensor 44 electrically connected to an engine speed input, ES, of controller 42 via signal path 46. Engine speed sensor 44 is operable to sense rotational speed of the engine 12 and produce an engine speed signal on signal path 46 indicative of engine rotational speed. In one embodiment, sensor 44 is a Hall effect sensor operable to determine engine speed by sensing passage thereby of a number of equi-angularly spaced teeth formed on a gear or tone wheel. Alternatively, engine speed sensor 44 may be any other known sensor operable as just described including, but not limited to, a variable reductance sensor or the like. In certain embodiments, system 10 includes an engine position sensor (not shown) that detects a current position of the crankshaft.

System 10 further includes an intake manifold temperature sensor 48 disposed in fluid communication with the intake manifold 14 of engine 12, and electrically connected to an intake manifold temperature input (IMT) of controller 42 via signal path 50. Intake manifold temperature sensor 48 may be of known construction, and is operable to produce a temperature signal on signal path 50 indicative of the temperature of air charge flowing into the intake manifold 14, wherein the air charge flowing into the intake manifold 14 is generally made up of fresh air supplied by the turbocharger compressor 16.

System 10 further includes an intake manifold pressure sensor 52 disposed in fluid communication with intake manifold 14 and electrically connected to an intake manifold pressure input (IMP) of controller 42 via signal path 54. Alternatively, pressure sensor 52 may be disposed in fluid communication with intake conduit 20. In any case, pressure sensor 52 may be of known construction, and is operable to produce a pressure signal on signal path 54 indicative of air pressure within intake conduit 20 and intake manifold 14.

System 10 also includes an exhaust manifold pressure sensor 72 disposed in fluid communication with exhaust manifold 30 and electrically connected to an exhaust manifold pressure input (EMP) of controller 42 via signal path 72a. Alternatively, pressure sensor 72 may be disposed in the fluid communication with exhaust conduit 32. In any case, pressure sensor 72 may be of known construction and is operable to produce pressure signal on signal path 72a indicative of gas pressure within exhaust conduit 32 and exhaust manifold 30.

Other control mechanisms included within system 10 is electronically controllable throttle 60 electrically connected to controller 42 via a signal path 64 and an electronically controllable wastegate valve 38 having a wastegate valve actuator 40 electrically connected to controller 42 via a signal path 66. Controller 42 is operable to produce a throttle control signal to control the position of the throttle 60 relative to a reference position. The position of the throttle 60 determines the flow rate of air into intake manifold 14 and thus into cylinders 12a-12h. Therefore, the pressure drop across engine 12 and the air-to-fuel ratio in cylinders 12a-12h can be controlled to, as discussed further below, provide or increase exhaust recirculation in cylinders 12a-12h as throttle 60 is closed.

The wastegate valve 38 has an inlet fluidly coupled to exhaust conduit 32, and an outlet fluidly coupled to exhaust conduit 34. Controller 42 is operable to produce a wastegate valve control signal to control the position of the wastegate valve 38 relative to a reference position. The position of the wastegate valve 38 defines a cross-sectional flow area therethrough, and by controlling the cross-sectional flow area of the wastegate valve, wastegate valve 38 is operable in isolation or in conjunction with throttle 60 to selectively divert exhaust gas away from turbine 26 to control the swallowing efficiency of turbine 26. Wastegate valve 38 is operable in isolation or in conjunction with throttle 60 to control the back pressure of exhaust gas in engine 12, the pressure drop of the exhaust gas flow across engine 12, and the air-to-fuel ratio in cylinders 12a-12h in accordance with operating parameters of engine 12, such as engine speed and load.

Controller includes a separate output FC1 through FC8 (also collectively designed fuel command outputs FC) to control operation of each fuel injector 13a-13h, respectively. The signal paths for outputs FC are also collectively designated by reference numeral 70 in FIG. 1; however, it should be understood that the timing of fuel injected by each injector 13a-13h can be independently controlled for each piston P1-P8 with controller 42. In addition to the timing of fuel injection, controller 42 can also regulate the amount of fuel injected. Typically, fuel amount varies with the number and duration of injector-activating pulses provided to injectors 13a-13h. Furthermore, controller 42 can direct the withholding of fuel from one or more cylinders 12a-12h (and pistons P1-P8) for a desired period of time.

In addition, controller 42 includes separate outputs EGR1 through EGR8 (also collectively designated exhaust gas recirculation command outputs EGR) to respectively activate and deactivate exhaust valve actuators 15a-15h to selectively open and close an exhaust valve in each of the cylinders to admit a quantity of exhaust gas into the cylinders. The signal paths for outputs EGR are also collectively designated by reference numeral 71 in FIG. 1; however, it should be understood that the timing and activation of exhaust valve actuators 15a-15h can be independently controlled for each piston P1-P8 with controller 42. As discussed further below, exhaust valve actuation is conducted to open the exhaust valve at, for example, the beginning of the intake stroke of the piston in the respective cylinder so that exhaust gas is admitted to the cylinder to increase the temperature therein, thus more rapidly increasing the exhaust gas temperature. The duration of exhaust valve opening during the intake stroke can vary depending on the quantity exhaust gas desired to be recirculated. Accordingly, the composition of gas flowing into each cylinder changes from an air/fuel charge to a composition that includes various amounts of exhaust gas when the exhaust valves are open during the intake stroke of the piston.

In still other embodiments, controller 42 can include separate outputs (not shown) to respectively activate and deactivate engine braking through separate engine brake actuators (not shown). Engine brake actuators can be automatically or manually activated in response to an operator input, such as may be desired during downhill travel for a heavy duty application. In still other embodiments, such compression braking alternatives are not available.

For a nominal combustion mode of operation of cylinders 12a-12h, controller 42 determines an appropriate amount of fueling as a function of the engine speed signal ES from engine speed sensor 44 as well as a one or more other parameters such as engine load; and generating corresponding fueling command output signals FC, with appropriate timing relative to ignition, using techniques known to those skilled in the art. Controller 42 also determines an appropriate timing and duration for opening and closing of exhaust valves to increase exhaust temperature and aftertreatment system efficiency to obtain a desired operational efficiency of the aftertreatment system 80; and generating corresponding exhaust gas recirculation command output signals EGR1-8, with appropriate timing relative to ignition. Controller 42 also executes logic to regulate various other aspects of engine operation based on the various sensor inputs available, and to generate corresponding control signals with outputs FC, EGR, TH, WG, or one or more others (not shown). Furthermore, in some applications it is desirable to control one or more aspects of the operation of system 10 based on a temperature of the exhaust output by engine 12 and/or turbine 26.

System 10 also includes aftertreatment system 80 to provide for aftertreatment of exhaust gases before discharge through a conduit 94. As discussed further below, the techniques and systems described herein allow for operation of engine 10 in a manner that increases the efficiency of aftertreatment system 80 during cold start, low load, low temperature, and/or any other condition or conditions where increased efficiency of aftertreatment system 80 is desired. The techniques and systems discussed herein provide for internal exhaust gas recirculation without requiring a separate EGR system connecting intake conduit 20 and exhaust conduit 32, or a variable geometry turbine (VGT). Accordingly, components typically associated with such systems can be eliminated from the present invention without a sacrifice in aftertreatment operational efficiency. For example, an EGR cooler, an EGR valve and a VGT along with the associated plumbing and controls are not required and in certain embodiments are eliminated from the systems and techniques described herein.

During engine operation, exhaust gas flows from turbine outlet 27 and/or wastegate valve 38 through exhaust conduit 34 in fluid communication therewith. Conduit 34 is also in fluid communication with aftertreatment system 80, which receives the exhaust gas from turbine 26 for aftertreatment. Aftertreatment system 80 can include a number of devices to chemically convert and/or remove undesirable constituents from the exhaust stream before discharge into the environment.

In one specific embodiment, exhaust aftertreatment system 80 may include an oxidation catalyst (OC) 82 which is in fluid communication with exhaust flow path 34 and is operable to catalyze oxidation of one or more compounds in exhaust flowing through exhaust flow path 34, for example, oxidation of unburned hydrocarbons or oxidation of NO to $NO_2$. In another embodiment, exhaust aftertreatment system 80 may further include a diesel particulate filter (PF) 84 in fluid communication with exhaust flow path 34 and operable to reduce the level of particulates in exhaust flowing through exhaust flow path 34. In an exemplary embodiment diesel particulate filter 84 is a catalyzed soot filter. Other embodiments utilize other types of diesel particulate filters.

Exhaust aftertreatment system 80 may include a reductant injector 86 and an SCR catalyst 88. Reductant injector 86 is supplied with reductant from a reductant reservoir (not shown) and is operable to inject reductant into exhaust flow path 34. In an exemplary embodiment the reductant is an aqueous solution of urea which decomposes to provide ammonia. Other embodiments utilize different reductants, for example, aqueous solutions of ammonia, anhydrous ammonia, or other reductants suitable for SCR. Reductant injected into exhaust flow path 34 is provided to SCR catalyst 88 which is in flow communication with exhaust flow path 34 and is operable to catalyze the reduction of $NO_x$. The SCR catalyst 88 can be of any type of SCR catalyst known in the art. Exhaust aftertreatment system 80 further includes a hydrocarbon (HC) injector 90 which is supplied with HC from an HC reservoir (not shown) and is operationally coupled to the exhaust stream at a position upstream of SCR catalyst 88. Other embodiments contemplate HC injector 90 is omitted and hydrocarbons are added by the fuel system or any other suitable means known in the art.

Exhaust flow path 34, as illustrated schematically in FIG. 1, may be provided in a variety of physical configurations and the order of the aftertreatment components could be changed. For example, the PF 84 could be provided downstream from SCR catalyst 88. In an exemplary embodiment an exhaust flow path proceeds from the output of a turbocharger of an engine through a conduit to a structure containing an oxidation catalyst and a diesel particulate filter, through a second conduit to a structure containing an SCR catalyst and through another conduit which outlets to the ambient environment. This embodiment may also include an ammonia oxidation AMOX catalyst (not shown) at a position downstream of the SCR catalyst, which is operable to catalyze the reaction of $NH_3$ which slips past the SCR catalyst.

Controller 42 includes a number of inputs for receiving signals from various exhaust temperature sensors associated with system 10. For example, system 10 includes an exhaust temperature sensor 34a disposed in fluid communication with exhaust conduit 34 and connected to a temperature input Ex1. Exhaust temperature sensor 34a is operable to sense the temperature of the exhaust as it enters aftertreatment system 80. System 10 further includes an exhaust temperature sensor 80a which provides controller 42 with information indicative of the temperature of the exhaust flowing out of aftertreatment system 80, and electrically connected to temperature input Ex2 of controller 42. Sensors 34a and 80a can be of any standard type. In other embodiments, information from temperature sensors in various locations is utilized to determine information indicative of the temperature of SCR catalyst 88. Controller 42 may determine if a temperature of the exhaust stream is not within an ammonia based SCR range and, in response, provide an internal EGR command where exhaust gas is recirculated internally to lower $NO_x$ emissions to compensate for reduced SCR efficiency at low temperatures and to raise the temperature of the exhaust stream.

The reactions that take place in an ammonia based SCR system are in part temperature dependent. An effective temperature range for an ammonia based SCR system depends on the various fuels, gas constituents, $NO:NO_2$ ratio, catalyst composition and catalyst geometry of the system. Operating outside of the temperature range for these reactions may reduce efficiency of any one or multiple reactions thereby reducing the efficiency of the system. A less efficient system may result in an unacceptable level of various components in the exhaust. Internal EGR operation can lower $NO_x$ emissions during cold temperature operations and raise the temperature of the exhaust stream so that aftertreatment system 80 operates efficiently in a manner that can be accomplished more quickly than without internal EGR, and therefore lessen emissions impact of the system when temperature excursions occur below the SCR threshold during operation of engine 12.

Figure 2:
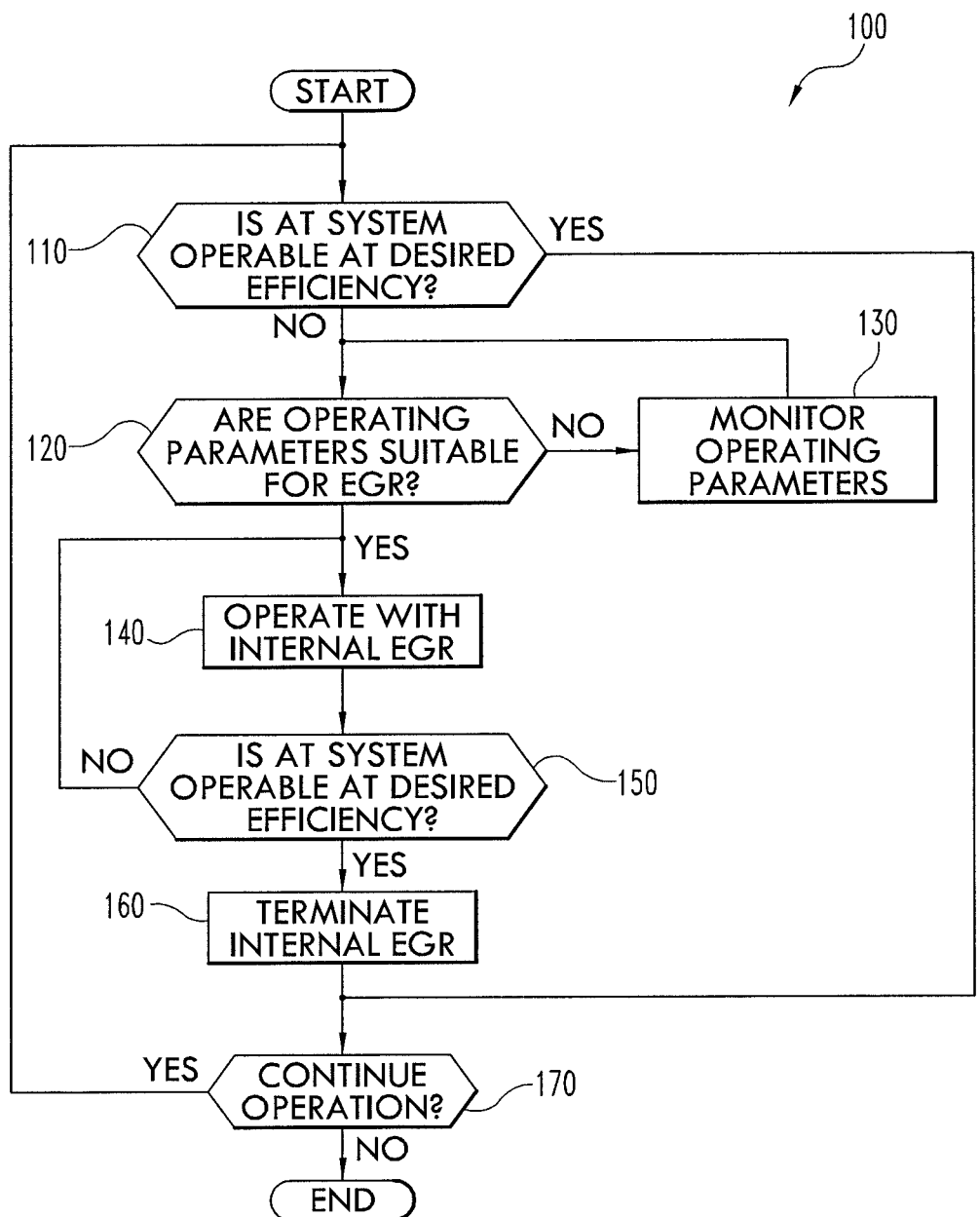
FIG. 2 is a flowchart corresponding to a procedure for controlling an internal combustion engine to lower $NO_x$ emissions and provide efficient operation of the aftertreatment system of FIG. 1.

FIG. 2 illustrates an internal EGR control procedure 100 in flowchart form, which can be implemented with system 10 using appropriate operating logic executed by controller 42. Procedure 100 is directed to operating engine 12 with internal EGR to lower $NO_x$ emissions while elevating exhaust temperature to an SCR threshold where aftertreatment system 80 operates at a desired efficiency. As discussed above, operation of the SCR is in part temperature dependent, so that temperature threshold may vary depending on the operating parameters of engine 12. The schematic flow diagram and related description which follows provides an illustrative embodiment of performing procedures for engaging internal EGR to improve efficiency of the aftertreatment system. Operations illustrated are understood to be exemplary only, and operations may be combined or divided, and added or removed, as well as re-ordered in whole or part. Certain operations illustrated may be implemented by a computer executing a computer program product on a computer readable medium, where the computer program product comprises instructions causing the computer to execute one or more of the operations, or to issue commands to other devices to execute one or more of the operations.

Procedure 100 begins with conditional 110. Conditional 110 tests whether one or more components of aftertreatment system 80 is operable at a desired efficiency. Further discussion of this determination is provided below with respect to conditional 150. If the test of conditional 110 is positive (YES), then procedure 100 continues with conditional 170. Conditional 170 tests whether to continue procedure 100 or to halt procedure 100. If the test of conditional 170 is negative (NO), then procedure 100 stops. If the test of conditional 170 is positive (YES), then procedure 100 returns to repeat conditional 110.

If the test of conditional 110 is negative (NO), then procedure 100 continues at conditional 120 to test whether operating parameters are suitable for internal EGR operation. For example, in certain cold ambient conditions, internal EGR is not advisable due to combustion instabilities. If conditional 120 is negative (NO), then procedure 100 continues at operation 130, where operating parameters are monitored until a positive (YES) determination at conditional 120 can be made. In one embodiment, conditional 120 determines the temperature of the exhaust stream is above a lower threshold such that internal EGR operation is available without combustion instabilities. Other embodiments include additionally or alternatively determining the coolant temperature and the intake manifold temperature is above a lower threshold.

When the test of conditional 120 is positive (YES), procedure 100 continues at operation 140 where internal EGR operation is initiated. Operation 140 causes controller 42 to command exhaust valve actuators 15a-15h to open the exhaust valve of one or more cylinders 12a-12h during the intake stroke of the corresponding piston to internally recirculate exhaust gas in one or more of cylinders 12a-12h, thereby causing the exhaust temperature to increase more rapidly than would be possible without internal EGR operation. In one specific embodiment, the exhaust valve is opened at the beginning of the intake stroke so that the corresponding piston is provided a maximum amount of time to draw exhaust gases into the respective cylinder. Other embodiments contemplate that the exhaust valve is opened at any time during the intake stroke.

The quantity of exhaust gas recirculated can be increased by closing intake throttle 60, resulting in additional exhaust gas remaining in cylinders 12a-12h when the respective exhaust valve is opened during the intake stroke of the respective piston. Furthermore, wastegate valve 38 can be controlled in conjunction with throttle 60 by, for example, opening wastegate valve 38 to reduce internal EGR to maximize fuel efficiency during internal EGR operation. As a result of adding exhaust gas into cylinders 12a-12h, heating of the exhaust gas is increased more rapidly to raise the temperature of the exhaust stream to aftertreatment system 80.

An exemplary internal EGR operation includes adjusting the throttle opening and closing percentage and/or the wastegate valve opening and closing percentage when exhaust valve actuators 15a-15h are commanded to open the respective exhaust valve to provide the desired quantity of internal EGR based on the speed and load of engine 12 while minimizing the fuel consumption penalty. In addition, controlling the closing of the throttle and wastegate allows for control of the air-to-fuel ratio and thus the ability to raise the exhaust temperature in this manner. For example, the throttle and wastegate valve operations can be calibrated based on engine speed and load, intake pressure, and intake temperature during initial engine set up and provided as values in a look up table or tabulated set of values stored in the memory of controller 42. If additional pressure drop across engine 12 is desired, then throttle 60 can be closed further to restrict intake air flow. If the pressure drop across engine 12 is to be reduced, the wastegate 38 can be opened to lower the pressure in the exhaust system and reduce internal EGR. The look up table or tabulated set of values are referenced by utilizing a nearest value, an interpolated value, an extrapolated value, and/or a limited value at the end points of the table or tabulated values. The look up table or tabulated set of values may, additionally or alternatively, be referenced by any other operations understood in the art. In still another embodiment, throttle and wastegate closing percentages are calculated during realtime operation based on, for example, engine speed, engine load, intake pressure, and intake temperature to provide a throttle and/or wastegate closing command that provides a desired internal EGR quantity while minimizing the fuel consumption penalty.

During execution of operation 140, procedure 100 continues with conditional 150. Conditional 150 tests whether the efficiency of aftertreatment system 80 is above a threshold for efficient operation. This threshold value may vary with performance conditions of aftertreatment system 80 and/or engine 12. If the test of conditional 150 is negative (NO), then procedure 100 continues with operation 140. In certain embodiments, the decision whether the aftertreatment system 80 is operable at the desired efficiency at conditional 150 may be established by one or more of the following options: (1)

determining the temperature of the exhaust stream and/or the temperature of one or more components of aftertreatment system 80 is above a lower threshold; 2) determining the exhaust stream temperature is below an upper threshold; (3) determining whether $NO_x$ emissions are below a suitable threshold by looking at readings from one or more of $NO_x$ sensors; and (4) determining that one or more components of aftertreatment system 80 are operable at a desired effectiveness. The determination of specific range values depends upon system factors that are known to those of skill in the art contemplating a particular system. For example, the SCR threshold temperature at which aftertreatment system operates effectively depends upon the oxidation rate of ammonia for the particular SCR catalyst 88, the acceptable lower end of $NO_x$ reduction for the temperature, the availability of any $NO_x$-mitigation techniques at lower temperatures, the percentage of the expected application duty cycle that will experience the lower temperatures, and the available $NO_x$ emission rates at other system operating conditions that allow elevated $NO_x$ emissions rates to be averaged in with the other system operating conditions. The balancing of the various system impacts by utilizing internal EGR, including at least emissions, fuel consumption, and operator satisfaction impacts, is a mechanical step for one of skill in the art having the benefit of the disclosures herein.

If the test of conditional 150 is positive (YES), then procedure 100 continues with operation 160. Operation 160 terminates internal EGR and engine 12 operates normally without internal EGR. In addition, throttle 60 is opened at operation 160 to allow for normal engine operation. After execution of operation 160, procedure 100 continues with conditional 170, which as previously described, tests whether to continue procedure 100 or halt procedure 100.

Many other embodiments of the present invention are also envisioned. For example, in other embodiments, one or more additional forms of restrictions in the air inlet and exhaust gas flow path are used to augment the internal EGR. In another example, temperature associated with desired operation of aftertreatment system is additionally or alternatively raised through varying the timing and duration of exhaust valve opening and closing during the intake stroke of the piston of the respective cylinders as would occur to those skilled in the art. In still other examples, elevation of exhaust temperature is performed in accordance with the present application for a reason other than aftertreatment, and indeed, certain aftertreatment system disclosed herein may or may not be included in such applications.

Another example comprises: operating an internal combustion engine system including an engine with a plurality of pistons housed in respective ones of a plurality of cylinders, an intake system for delivering air to the plurality of pistons through respective ones of a plurality of intake valves, an exhaust system for receiving exhaust emission from the plurality of cylinders through respective ones of a plurality of exhaust valves, and an aftertreatment system to treat exhaust emission from the engine; and opening the exhaust valves during an intake stroke of a corresponding one of the plurality of pistons to internally recirculate exhaust gas in the respective cylinder when the aftertreatment system is operating at less than a desired efficiency to raise a temperature of an exhaust stream from the plurality of cylinders.

In still another example, a method comprises: operating an internal combustion engine system including an engine with a plurality of pistons housed in respective ones of a plurality of cylinders, each of the cylinders including an intake valve for admitting air from an intake system of the internal combustion engine system and an exhaust valve for releasing an exhaust gas from the cylinder, and an aftertreatment system to treat exhaust emissions carried by an exhaust system from the engine; recirculating the exhaust gas in at least a portion of the plurality of cylinders by opening the corresponding exhaust valve during an intake stroke of the piston housed in the cylinder to increase temperature of the exhaust gas from the engine; increasing a temperature of the exhaust gas from the engine in response to the internal exhaust gas recirculation; monitoring an efficiency of the aftertreatment system; and terminating recirculation of exhaust gas in the cylinders when the efficiency of the aftertreatment system exceeds a threshold.

In still another example, an internal combustion engine system includes an engine with a plurality of pistons housed in respective ones of a plurality of cylinders; an air intake system to provide air to the plurality of cylinders through respective ones of a plurality of intake valves; an exhaust system to release exhaust gas from the plurality of cylinders through respective one of a plurality of exhaust valves; an aftertreatment system to treat exhaust emission from the engine; and at least one sensor to provide a sensor signal corresponding to an efficiency of the aftertreatment system. Also provided in the system is a controller coupled to the at least one sensor and operable to regulate an internal exhaust gas recirculation operation in the cylinders. The controller is responsive to the sensor signal to generate one or more control signals to open the exhaust valves to admit exhaust gas into respective ones of the cylinders during an intake stroke of the corresponding piston and correspondingly raise the temperature of the exhaust gas and the aftertreatment system. The controller is responsive to one or more other control signals so that the exhaust valves remain closed during the intake stroke of the corresponding piston when the efficiency of the aftertreatment system exceeds a threshold.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. A method, comprising:
  operating an internal combustion engine system including an engine with a plurality of pistons housed in respective ones of a plurality of cylinders, an intake system for delivering air to the plurality of pistons through respective ones of a plurality of intake valves, an exhaust system for receiving exhaust emission from the plurality of cylinders through respective ones of a plurality of exhaust valves, and an aftertreatment system to treat exhaust emission from the engine;

determining a temperature of a selective catalytic reduction (SCR) catalyst of the aftertreatment system is below a temperature threshold associated with an effective temperature range for operation of the SCR catalyst to reduce $NO_x$ in the exhaust emission from the engine;

opening one or more of the exhaust valves during an intake stroke of a corresponding one of the plurality of pistons to internally recirculate exhaust gas in the respective cylinder when the temperature of the SCR catalyst is less than the temperature threshold to at least one of lower engine $NO_x$ emissions and raise a temperature of an exhaust stream from the plurality of cylinders, wherein opening of the exhaust valve during the intake stroke of the corresponding piston during recirculating the exhaust gas is controlled by an exhaust valve actuator that is independent of a camshaft that opens the exhaust valve during engine operation, and terminating opening of the exhaust valves during the intake stroke of the plurality of pistons when $NO_x$ emissions from the aftertreatment system are less than an $NO_x$ emissions threshold.

2. The method of claim 1, further comprising terminating opening of the exhaust valves during the intake stroke of the plurality of pistons when the temperature of the SCR catalyst is above the temperature threshold.

3. The method of claim 1, further comprising controlling a throttle of the intake system to increase a pressure drop across the engine to provide a desired quantity of exhaust gas in the cylinder when the exhaust valve is opened during the intake stroke.

4. The method of claim 3, further comprising controlling a wastegate valve in the exhaust system in conjunction with intake throttle to control at least one of the pressure drop across the engine and an air-fuel ratio.

5. The method of claim 1, further comprising:
determining that a temperature of exhaust gas produced by operating the engine is above a lower threshold below which is associated with combustion instabilities caused by internal exhaust gas recirculation; and
in response to the exhaust temperature being above the lower threshold, opening the one or more of the exhaust valves during the intake stroke of the corresponding one of the plurality of pistons to internally recirculate the exhaust gas.

6. The method of claim 5, further comprising determining that a coolant temperature and an intake manifold temperature are above a lower threshold.

7. A method, comprising:
operating an internal combustion engine system including an engine with a plurality of pistons housed in respective ones of a plurality of cylinders, each of the cylinders including an intake valve for admitting air from an intake system of the internal combustion engine system and an exhaust valve for releasing an exhaust gas from the cylinder, and an aftertreatment system to treat exhaust emissions carried by an exhaust system from the engine;
determining a temperature of a selective catalytic reduction (SCR) catalyst of the aftertreatment system is below a temperature threshold associated with an effective temperature range for operation of the SCR catalyst to reduce $NO_x$ in the exhaust emissions from the engine;
in response to the temperature of the SCR catalyst being less than the temperature threshold, recirculating the exhaust gas in at least a portion of the plurality of cylinders by opening the corresponding exhaust valve during an intake stroke of the piston housed in the cylinder, wherein opening of the exhaust valve during the intake stroke of the corresponding piston during recirculating the exhaust gas is controlled by an exhaust valve actuator that is independent of a camshaft that opens the exhaust valve during engine operation;

at least one of lowering $NO_x$ emissions and increasing a temperature of the exhaust gas from the engine in response to the internal, exhaust gas recirculation in the cylinders;
and
terminating recirculation of exhaust gas in the cylinders when $NO_x$ emissions from the aftertreatment system are less than an $NO_x$ emissions threshold.

8. The method of claim 7 wherein monitoring the efficiency includes monitoring the exhaust temperature.

9. The method of claim 7, further comprising controlling a throttle of the intake system to create a pressure drop across the engine that provides a desired quantity of exhaust gas in the cylinder when the exhaust valve is opened during the intake stroke and controlling a wastegate valve in the exhaust system in conjunction with the throttle to control the pressure drop across the engine.

10. The method of claim 7, further comprising terminating recirculation of exhaust gas in the cylinders when the temperature of the exhaust or one or more components of the aftertreatment system exceed a temperature threshold.

11. The method of claim 7, further comprising determining from operating parameters of the internal combustion engine system that an exhaust gas temperature is above a lower threshold before recirculating the exhaust gas.

12. The method of claim 7, wherein during recirculating the exhaust gas in at least a portion of the plurality of cylinders the corresponding exhaust valve is opened at a beginning of the intake stroke of the piston.

13. The method of claim 7, further comprising:
determining that a temperature of exhaust gas produced by operating the engine is above a lower threshold below which is associated with combustion instabilities caused by internal exhaust gas recirculation; and
in response to the exhaust temperature being above the lower threshold, opening the one or more of the exhaust valves during the intake stroke of the corresponding one of the plurality of pistons to internally recirculate the exhaust gas.

14. An internal combustion engine system, comprising:
an engine with a plurality of pistons housed in respective ones of a plurality of cylinders;
an air intake system to provide air to the plurality of cylinders through respective ones of a plurality of intake valves;
an exhaust system to release exhaust gas from the plurality of cylinders through respective one of a plurality of exhaust valves, wherein each of the plurality of exhaust valves is coupled to an exhaust valve actuator;
an aftertreatment system including a selective catalytic reduction (SCR) catalyst to treat exhaust emission from the engine;
at least one sensor to provide a sensor signal indicative of an efficiency of the aftertreatment system; and
a controller coupled to the at least one sensor and operable to regulate an internal exhaust gas recirculation operation in the cylinders, the controller being responsive to the sensor signal to generate one or more control signals to open the exhaust valves to admit exhaust gas into respective ones of the cylinders during an intake stroke of the corresponding piston and correspondingly at least one of lower $NO_x$ emissions and raise the temperature of the exhaust gas and the aftertreatment system when the efficiency of the aftertreatment system is below a threshold including $NO_x$ emissions from the aftertreatment system being greater than an $NO_x$ emission threshold, wherein the controller is structured to:

determine a temperature of the SCR catalyst is below a temperature threshold associated with an effective temperature range for operation of the SCR catalyst to reduce $NO_x$ in the exhaust emissions from the engine;

determine that a temperature of an exhaust gas produced by operating the engine is above a lower threshold below which is associated with combustion instabilities caused by internal exhaust gas recirculation;

in response to the temperature of the SCR catalyst being below the temperature threshold and the temperature of the exhaust gas being above the lower threshold, generate the one or more control signals to open the exhaust valves to admit exhaust gas into respective ones of the cylinders during the intake stroke of the corresponding piston, wherein the controller is operable to control opening and closing of the exhaust valves with the exhaust valve actuators during internal exhaust gas recirculation operation independently of a camshaft that opens and closes the exhaust valves during non-internal exhaust gas recirculation.

15. The system of claim 14 wherein the controller is responsive to one or more other control signals so that the exhaust valves remain closed during the intake stroke of the corresponding piston when the efficiency of the aftertreatment system exceeds the threshold.

16. The system of claim 14, further comprising a throttle in the air intake system and the controller is responsive to the sensor signal to close the throttle to increase a pressure drop across the cylinders and increase the quantity of exhaust gas recirculated in the cylinders during internal exhaust gas recirculation operation.

17. The system of claim 16, further comprising a wastegate valve in the exhaust system and the controller is responsive to the sensor signal to control the wastegate valve in conjunction with the throttle to control the pressure drop across the cylinders during internal exhaust gas recirculation operation.

* * * * *